(12) United States Patent
Fukui

(10) Patent No.: US 10,152,224 B2
(45) Date of Patent: Dec. 11, 2018

(54) MOBILE TERMINAL, NON-TRANSITORY COMPUTER READABLE STORAGE MEDIUM, AND METHOD FOR SETTING INVALID AREA

(71) Applicant: KYOCERA CORPORATION, Kyoto (JP)

(72) Inventor: Yujiro Fukui, Kawanishi (JP)

(73) Assignee: KYOCERA CORPORATION, Kyoto (JP)

( * ) Notice: Subject to any disclaimer, the term of this patent is extended or adjusted under 35 U.S.C. 154(b) by 418 days.

(21) Appl. No.: 14/947,053

(22) Filed: Nov. 20, 2015

(65) Prior Publication Data

US 2016/0077731 A1 Mar. 17, 2016

Related U.S. Application Data

(63) Continuation of application No. PCT/JP2014/064090, filed on May 28, 2014.

(30) Foreign Application Priority Data

May 28, 2013 (JP) .................. 2013-111472

(51) Int. Cl.
*G06F 3/0488* (2013.01)
*G06F 3/041* (2006.01)
*G06F 21/36* (2013.01)

(52) U.S. Cl.
CPC ........ *G06F 3/04883* (2013.01); *G06F 3/0418* (2013.01); *G06F 3/0488* (2013.01); *G06F 21/36* (2013.01)

(58) Field of Classification Search
CPC .... G06F 3/04883; G06F 3/0418; G06F 21/36; G06F 3/0488
(Continued)

(56) References Cited

U.S. PATENT DOCUMENTS

2011/0234502 A1* 9/2011 Yun .................. G06F 3/016
345/173
2012/0105481 A1* 5/2012 Baek .................. G06F 3/0418
345/652

(Continued)

FOREIGN PATENT DOCUMENTS

JP 2012-234386 11/2012

OTHER PUBLICATIONS

International Search Report in International Application No. PCT/JP2014/064090, dated Sep. 2, 2014, in 2 pages.
(Continued)

*Primary Examiner* — Amit Chatly
(74) *Attorney, Agent, or Firm* — Duane Morris LLP

(57) ABSTRACT

A mobile terminal includes a display unit and a touch unit located on a surface of the display unit. The display unit is configured to display a lock screen capable of setting a locked state in which execution of a predetermined processing based on a touch operation is restricted and capable of releasing the locked state through a touch operation performed on the touch unit while the locked state is set. The mobile terminal comprises at least one processor configured to: detect a touch operation performed on a predetermined area of the lock screen; and set, in a case where the detection module detects a touch operation performed on the predetermined area, an invalid area on the basis of the touch operation, the invalid area making a touch operation invalid.

8 Claims, 17 Drawing Sheets

(58) Field of Classification Search
USPC .................................................. 345/173–179
See application file for complete search history.

(56) References Cited

U.S. PATENT DOCUMENTS

2014/0051482 A1    2/2014  Makiguchi
2014/0068498 A1*   3/2014  Olsen ...................... G06F 11/32
                                                    715/781

OTHER PUBLICATIONS

Written Opinion of the International Searching Authority in International Application No. PCT/JP2014/064090, dated Sep. 2, 2014, in 4 pages.

* cited by examiner

F I G. 8
(a)
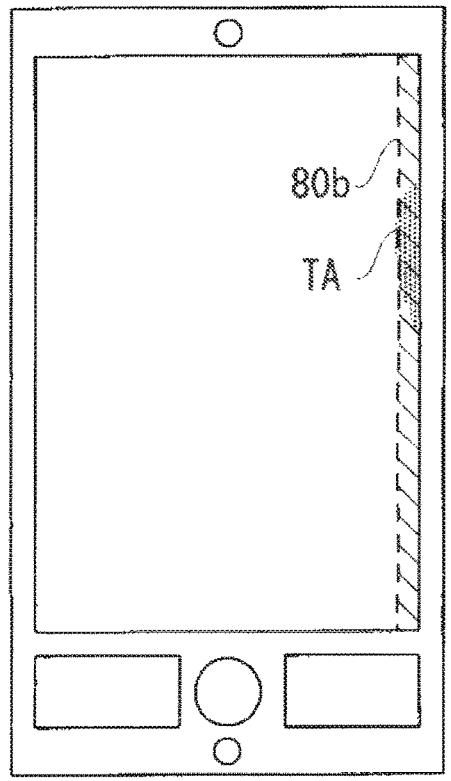
(b)
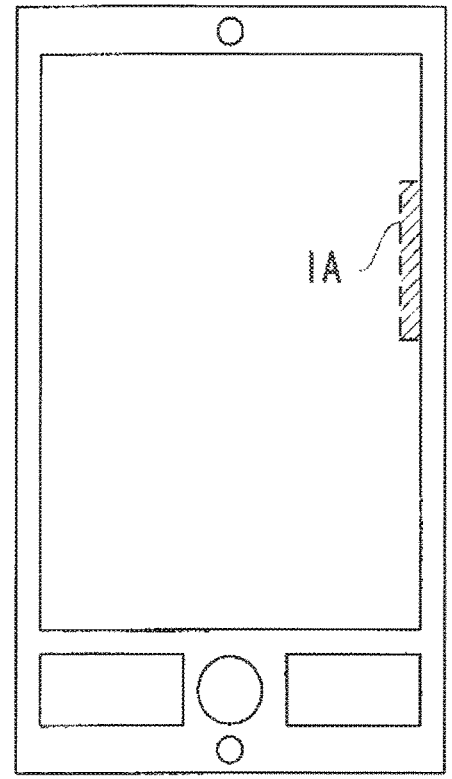

FIG. 9

HISTORY TABLE

| COORDINATES | LENGTH IN VERTICAL DIRECTION |
|---|---|
| $(X_1, Y_1)$ | $L_1$ |
| ⋮ | ⋮ |

FIG. 11
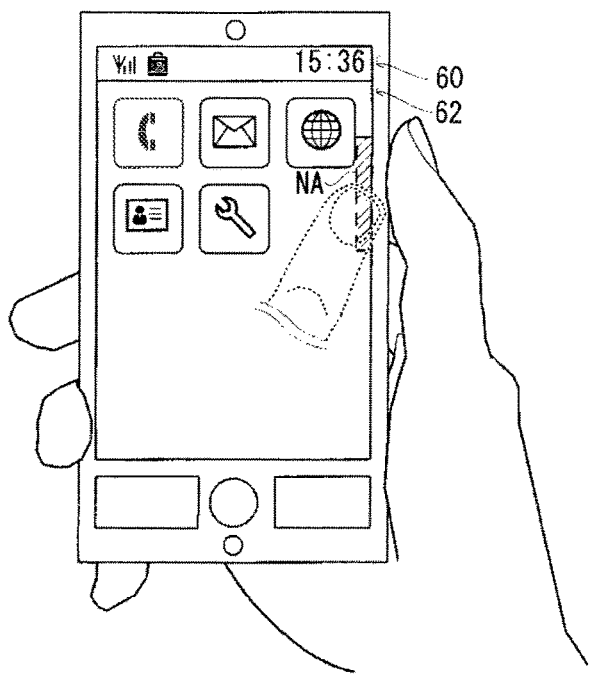
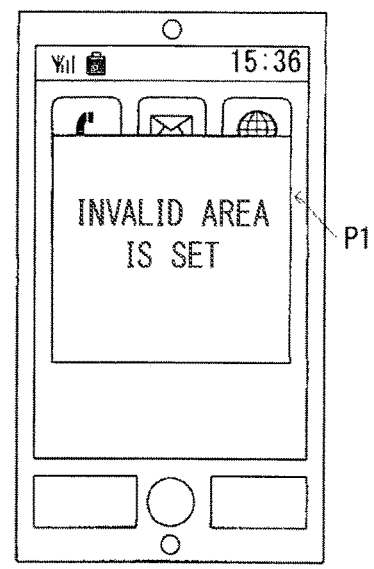
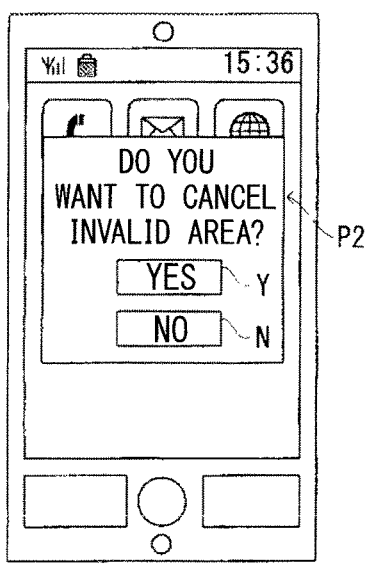

FIG. 12
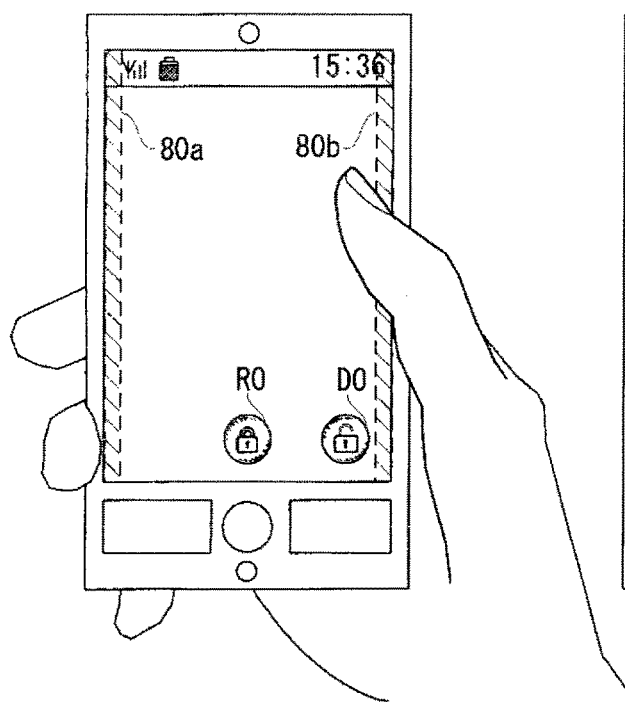
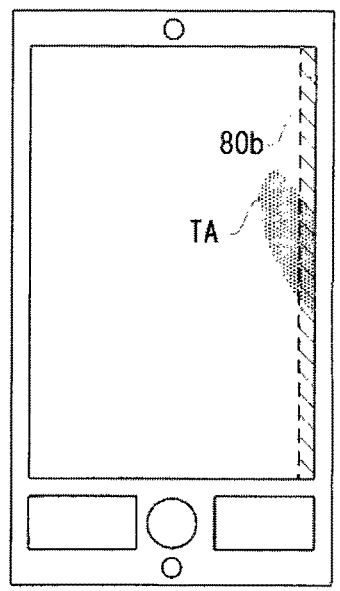
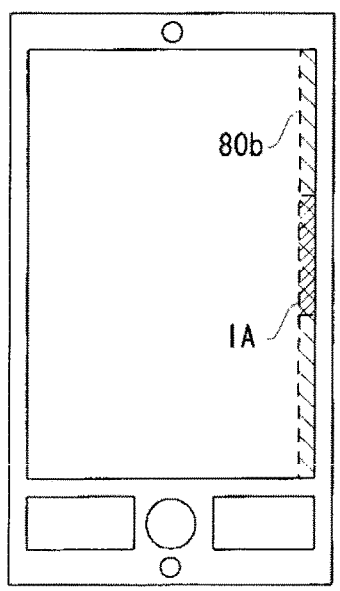

FIG. 13
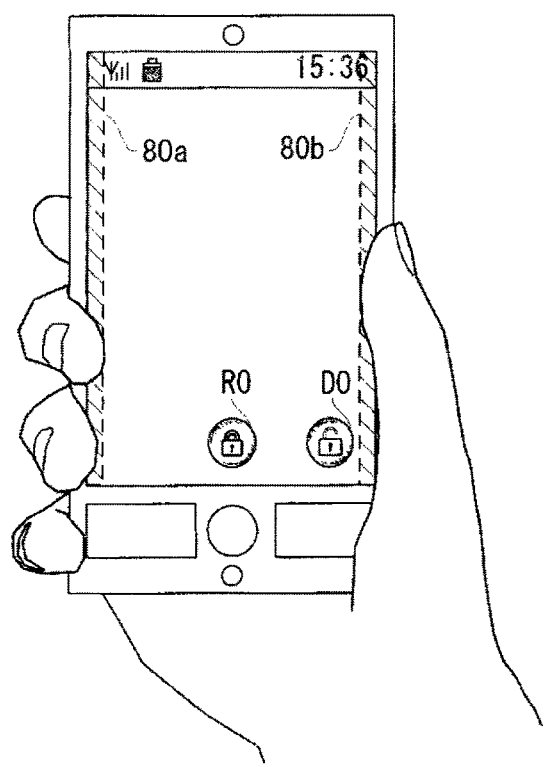
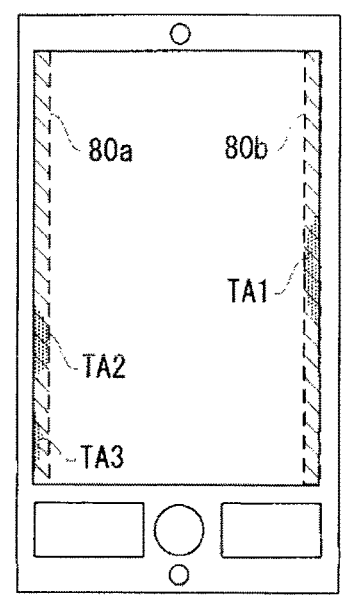
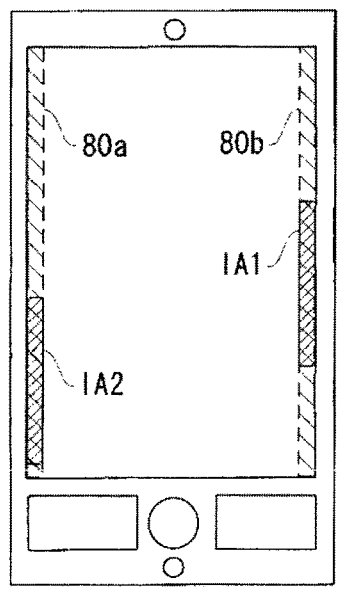

FIG. 14
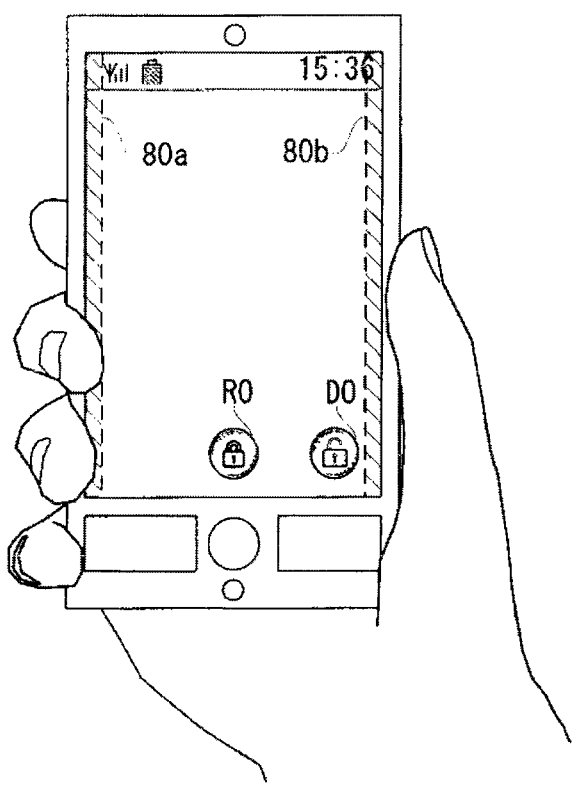
(a)
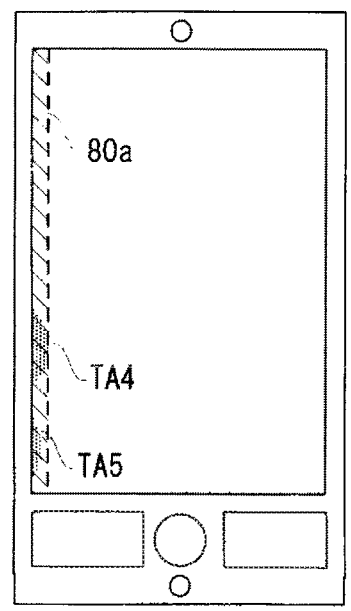
(b)
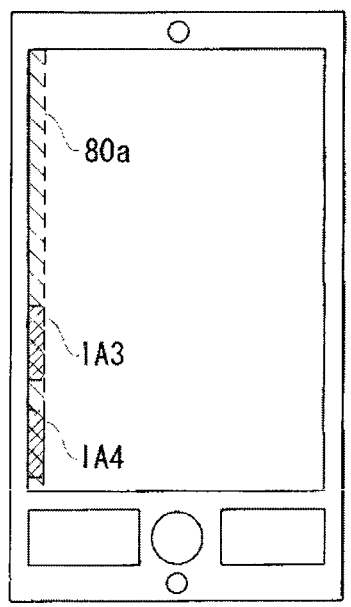
(c)

MOBILE TERMINAL, NON-TRANSITORY COMPUTER READABLE STORAGE MEDIUM, AND METHOD FOR SETTING INVALID AREA

CROSS-REFERENCE TO RELATED APPLICATION

The present application is a continuation based on PCT application No. PCT/JP2014/064090 filed on May 28, 2014, which claims the benefit of Japanese Application No. 2013-111472, filed on May 28, 2013. PCT application No. PCT/JP2014/064090 is entitled "PORTABLE TERMINAL, INVALID-AREA SETTING PROGRAM, AND METHOD FOR SETTING INVALID AREA" and Japanese Application No. 2013-111472 is entitled "MOBILE TERMINAL, INVALID AREA SETTING PROGRAM, AND METHOD FOR SETTING INVALID AREA". The contents of which is incorporated by reference herein in its entirety.

FIELD

Embodiments of the present disclosure relate generally to a mobile terminal, a non-transitory computer readable storage medium that stores an invalid area setting program, and a method for setting an invalid area, and more particularly relate to a mobile terminal including a touch unit, a non-transitory computer readable storage medium that stores an invalid area setting program, and a method for setting an invalid area.

BACKGROUND

A method has been known which allows a conventional mobile terminal to acquire, upon execution of an invalid area setting application, a contact area detected by a touch unit during execution of the application and to record the contact area as an invalid area.

SUMMARY

A mobile terminal, a non-transitory computer readable storage medium that stores an invalid area setting program, and a method for setting an invalid area are disclosed. In one embodiment, a mobile terminal includes a display unit and a touch unit located on a surface of the display unit. The display unit is configured to display a lock screen capable of setting a locked state in which execution of a predetermined processing based on a touch operation is restricted and capable of releasing the locked state through a touch operation performed on the touch unit while the locked state is set. The mobile terminal comprises at least one processor. The at least one processor is configured to: detect a touch operation performed on a predetermined area of the lock screen and set, in a case where the detection module detects a touch operation performed on the predetermined area, an invalid area on the basis of the touch operation, the invalid area making a touch operation invalid.

BRIEF DESCRIPTION OF THE DRAWINGS

FIG. 8 illustrates an example of a tentative invalid area set on the touch unit illustrated in FIG. 1. Part (a) of FIG. 8 illustrates an example of the positional relation between the touch area illustrated in FIG. 7 and the predetermined area. Part (b) of FIG. 8 illustrates an example of the tentative invalid area that has been set.

FIG. 9 illustrates a schematic view showing an example of the configuration of a history table stored in a RAM illustrated in FIG. 2.

FIG. 11 illustrates an example of the state in which a pop-up is displayed on the display illustrated in FIG. 1. Part (a) of FIG. 11 illustrates an example of the state in which a touch operation is performed on the invalid area. Part (b) of FIG. 11 illustrates an example of the state in which a notification pop-up is displayed. Part (c) of FIG. 11 illustrates an example of the state in which a checking pop-up is displayed.

FIG. 12 illustrates an example of the tentative invalid area set on the touch unit illustrated in FIG. 1. Part (a) of FIG. 12 illustrates another example of the state in which a touch operation is performed on the predetermined area illustrated in FIG. 5. Part (b) of FIG. 12 illustrates an example of the positional relation between the touch area detected through the touch operation illustrated in part (a) of FIG. 12 and the predetermined area. Part (c) of FIG. 12 illustrates an example of the positional relation between the tentative invalid area and the predetermined area.

FIG. 13 illustrates another example of the tentative invalid area set on the touch unit illustrated in FIG. 1. Part (a) of FIG. 13 illustrates another example of the state in which a touch operation is performed on the predetermined area illustrated in FIG. 5. Part (b) of FIG. 13 illustrates an example of the positional relation between the touch area detected through the touch operation illustrated in part (a) of FIG. 13 and the predetermined area. Part (c) of FIG. 13 illustrates another example of the positional relation between the tentative invalid area and the predetermined area.

FIG. 14 illustrates another example of the tentative invalid area set on the touch unit illustrated in FIG. 1. Part (a) of FIG. 14 illustrates still another example of the state in which a touch operation is performed on the predetermined area illustrated in FIG. 5. Part (b) of FIG. 14 illustrates an example of the positional relation between the touch area detected through the touch operation illustrated in part (a) of FIG. 14 and the predetermined area. Part (c) of FIG. 14 illustrates another example of the positional relation between the tentative invalid area and the predetermined area.

DETAILED DESCRIPTION

Figure 1:
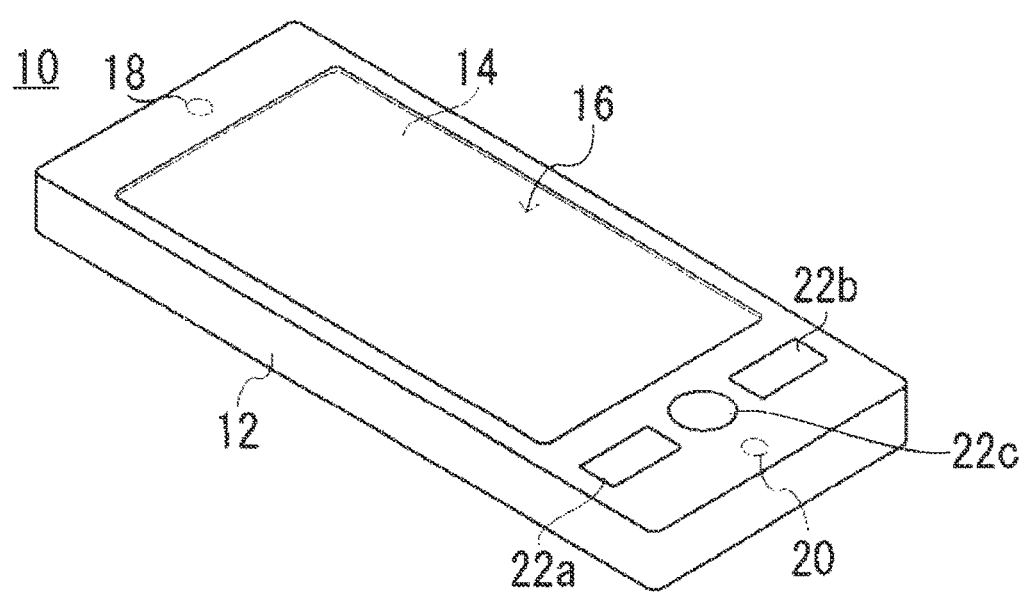
FIG. 1 illustrates an external view showing a mobile phone according to an embodiment of the disclosure.

As illustrated in FIG. 1, a mobile phone 10 according to one embodiment of the present disclosure is an example of applying one embodiment of the present disclosure to a smart phone. The mobile phone 10 includes a housing 12 having a flat rectangular shape longer than it is wide. It should be noted in advance that some embodiments of the present disclosure are applicable to any given mobile terminal including a tablet terminal and a personal digital assistant (PDA).

Provided on one main surface (the front surface) of the housing 12 is a display 14, such as a liquid crystal display and an organic electroluminescent (EL) display, that functions as a display unit. Provided on the display 14 is a touch unit 16 as a touch unit. Thus, for the mobile phone 10 according to one embodiment, the majority of the input operation except for the operation performed with hard keys described below is performed via the touch unit 16.

A speaker 18 is embedded in one longitudinal end of the housing 12 on the main surface side and a microphone 20 is embedded in another longitudinal end of the housing 12 on the main surface side.

In one embodiment, as the hard keys, a talk key 22a, an end key 22b, and a menu key 22c are located on one main surface of the housing 12. Along with the touch unit 16, the hard keys provide the input operation means.

A user can input a telephone number by performing, through the touch unit 16, touch operations on the dial keys displayed on the display 14 and start a voice communication by operating the talk key 22a. The voice communication can be ended in response to an operation performed on the end key 22b. The power of the mobile phone 10 can be turned on and off in response to a long press on the end key 22b.

A menu screen appears on the display 14 in response to an operation performed on the menu key 22c. In this state, menu selections and finalization of the selections can be performed through touch operations on soft keys and menu icons displayed on the display 14.

Figure 2:
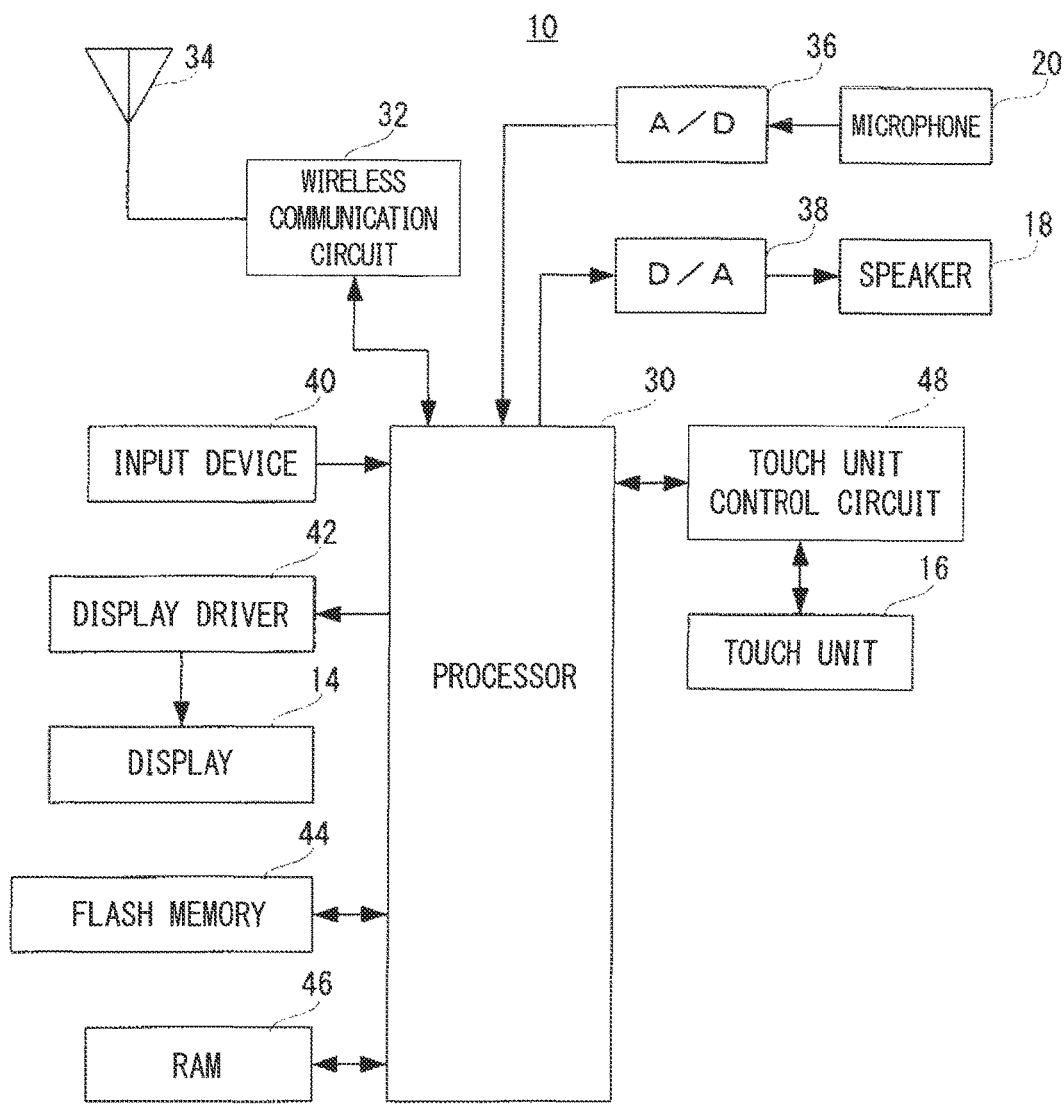
FIG. 2 illustrates an electrical configuration of the mobile phone illustrated in FIG. 1.

As illustrated in FIG. 2, the mobile phone 10 according to one embodiment illustrated in FIG. 1 includes a processor 30 referred to as a computer or a CPU. The processor 30 is connected with, for example, a wireless communication circuit 32, an A/D converter 36, a D/A converter 38, an input device 40, a display driver 42, a flash memory 44, a RAM 46, and a touch unit control circuit 48.

The processor 30 can perform the overall control over the mobile phone 10. When coming into use, all or part of the program preset in the flash memory 44 is expanded in the RAM 46 that can function as a storage unit. The processor 30 can operate in accordance with the program on the RAM 46. The RAM 46 can be also used as a work area or a buffer area for the processor 30.

The input device 40 includes hard keys 22 illustrated in FIG. 1. Thus, the input device 40 provides an operation receiving module that can accept key operations performed on the hard keys 22 by a user. The information (key data) on the hard key operated by the user is input to the processor 30.

The wireless communication circuit 32 is a circuit that can transmit and receive radio waves for voice communications and mails through an antenna 34. In one embodiment, the wireless communication circuit 32 is a circuit that can perform wireless communications based on the code division multiple access (CDMA) system. For example, when a user operates the input device 40 to provide instructions for making an outgoing telephone call (originating a call), the wireless communication circuit 32 can execute, under instructions from the processor 30, an outgoing telephone call processing and output an outgoing telephone call signal through the antenna 34. The outgoing telephone call signal is transmitted to the telephone on the other end of the line though the base station and the communication network. Then, the telephone on the other end of the line performs an incoming call processing to establish a communicable state, and thus, the processor 30 can execute a telephone communication processing.

The A/D converter 36 is connected with the microphone 20 illustrated in FIG. 1 and a voice signal from the microphone 20 is input, as digital voice data, to the processor 30 through the A/D converter 36. The D/A converter 38 is connected with the speaker 18. The D/A converter 38 can convert the digital voice data into a voice signal and provide the voice signal to the speaker 18 through an amplifier. Thus, the speaker 18 can output a voice based on the voice data.

The display driver 42 is connected with the display 14 illustrated in FIG. 1. Thus, the display 14 displays a video or an image in accordance with the video data or the image data output from the processor 30. That is, the display driver 42 can control, under the instructions from the processor 30, the displaying on the display 14 connected to the driver 42. The display driver 42 includes a video memory that temporarily stores the image data to be displayed. Provided on the display 14 is a backlight including, for example, a light emitting diode (LED) as a light source. The display driver 42 can control the brightness and the turning on and off of the backlight in accordance with the instructions from the processor 30.

The touch unit control circuit 48 is connected with the touch unit 16 illustrated in FIG. 1. The touch unit control circuit 48 can supply the touch unit 16 with, for example, a needed voltage and input, to the processor 30, a touch start signal indicating the start of the user's touching the touch unit 16, an end signal indicating the end of the user's touching, and coordinate data indicating the touch position touched by the user. Thus, the processor 30 can judge, on the basis of the coordinate data, which one of the icons and keys displayed on the display 14 is touched by the user.

In one embodiment, the touch unit 16 is a touch unit employing the capacitance system that detects changes in the capacitance generated between the surface of the touch unit 16 and an object such as a finger in close proximity to the surface. The touch unit 16 can detect that the touch unit 16 is touched by one or a plurality of fingers. Thus, the touch unit 16 is also referred to as a pointing device. The touch unit control circuit 48, which can function as a detection module, can detect a touch operation within the touch valid range of the touch unit 16 and output, to the processor 30, the coordinate data indicating the position of the touch operation. Thus, a user performs a touch operation on the surface of the touch unit 16, so that the position of the operation, the direction of the operation, and the like are input to the mobile phone 10.

The touch operations according to one embodiment include a tap operation, a long tap operation, a flick operation, and a slide operation.

The tap operation refers to an operation of bringing a finger into contact with (touching) the surface of the touch unit 16 and then moving (releasing) the finger off the surface of the touch unit 16 in a short time. The long tap operation refers to an operation of keeping a finger in contact with the surface of the touch unit 16 for a period equal to or greater than the predetermined period and then moving the finger off the surface of the touch unit 16. The flick operation is an operation of bringing a finger into contact with the surface of the touch unit 16 and then causing the finger to flip in a desired direction at a speed equal to or greater than the predetermined speed. The slide operation refers to the operation of moving a finger in a desired direction while keeping the finger in contact with the surface of the touch unit 16 and then moving the finger off the surface of the touch unit 16.

The above-mentioned slide operation includes the so-called drag operation being the slide operation of bringing a finger into contact with an object displayed on the surface of the display 14 and moving the object.

The operation of moving a finger off the surface of the touch unit 16 after the drag operation is hereinafter referred to as a drop operation. The word "operation" may be hereinafter omitted from the phrases including the touch operation, the long tap operation, the flick operation, the slide operation, the drag operation, and the drop operation.

The objects according to one embodiment include icons, shortcut icons, files, and folders for executing the functions.

The touch unit 16 can perform the detection by employing, in place of the above-mentioned capacitance system, the resistance film system, the ultrasonic system, the infrared system, the electromagnetic induction system, and the like. The touch operation may be performed not only with a finger of a user but also with, for example, a stylus pen.

The mobile phone 10 according to one embodiment can execute the mail function besides the telephone function.

The mobile phone 10 according to one embodiment can set the locked state in which the execution of the predetermined processing based on the touch operation is restricted in order to prevent operation errors resulting from unintended input performed on the touch unit 16 by a user. For example, in response to an operation on the end key 22b, the power of the display 14 and the power of the touch unit 16 are turned off, and at the same time, the locked state is set. In this state, in response to an operation on, for example, the menu key 22c, the power of the display 14 and the power of the touch unit 16 are turned on, providing the displaying of a lock screen (see FIG. 3) capable of releasing the locked state through a touch operation (release operation) performed on the touch unit 16. In a case where the displaying on the display 14 is unchanged for a certain period of time, the display 14 is automatically turned off, and accordingly, the locked state is set.

In the locked state in one embodiment, the power of the display 14 and the power of the touch unit 16 are off until the lock screen appears. This can regulate the power consumption of the mobile phone 10. In another embodiment, as a way to make the touch operation invalid without turning off the power of the touch unit 16, the processor 30 does not process the touch operation that has been input.

Figure 3:
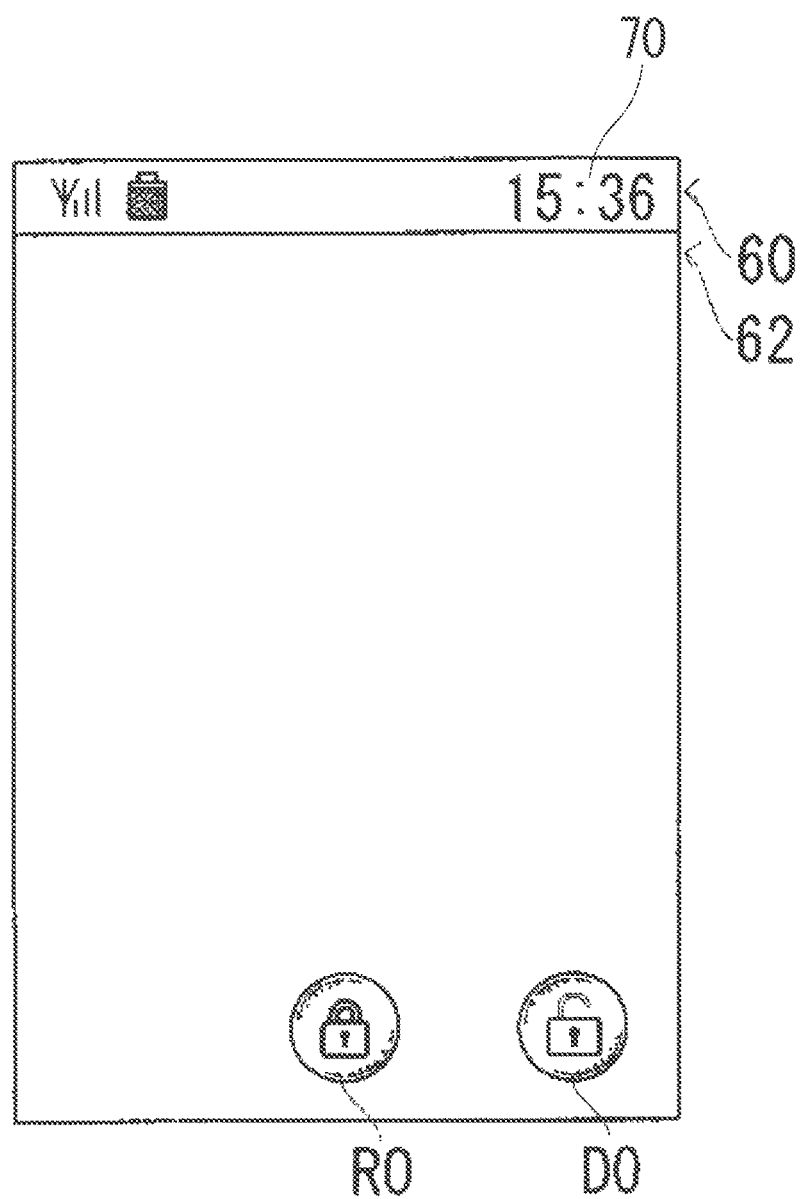
FIG. 3 illustrates an example of a lock screen displayed on a display illustrated in FIG. 1.

As illustrated in FIG. 3, the display range of the display 14 on which the lock screen appears includes a state display area 60 and a function display area 62. In the state display area 60 appear an icon (pict) indicating the radio wave reception state associated with the antenna 34, an icon indicating the remaining battery level of the secondary battery, and the date and time. In the function display area 62 appears a current date and time 70. On the lower side of the function display area 62 appear a lock object RO and a release object DO.

Figure 4:
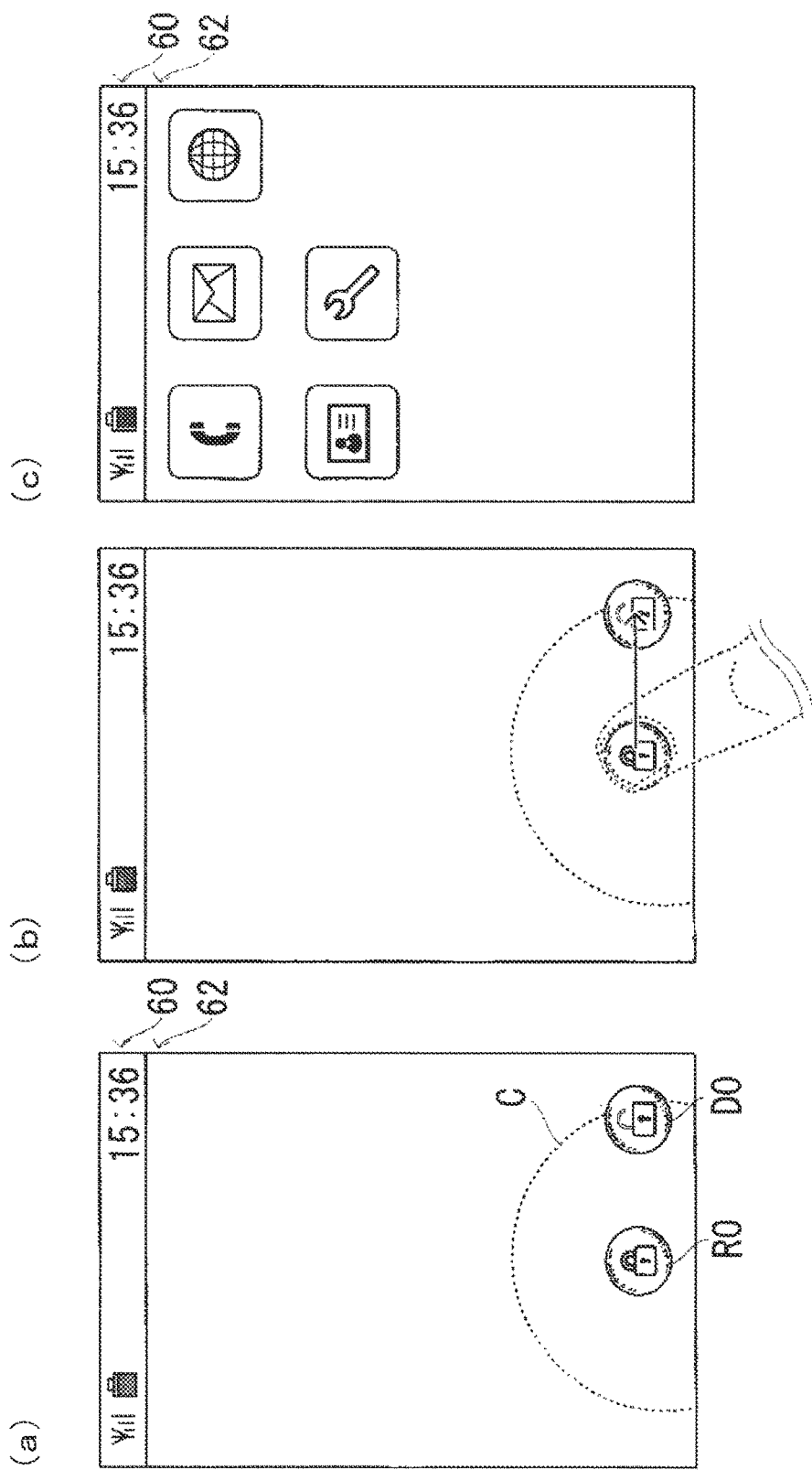
FIG. 4 illustrates an example of operation for releasing the locked state set for the mobile phone illustrated in FIG. 1. Part (a) of FIG. 4 illustrates an example of the state in which a circumference is further displayed on the lock screen illustrated in FIG. 3. Part (b) of FIG. 4 illustrates an example of the direction of a touch operation performed on a lock object illustrated in FIG. 3. Part (c) of FIG. 4 illustrates an example of a standby screen.

With reference to part (a) of FIG. 4, in response to a touch on the lock object RO, a circumference C is displayed in such a manner that the release object DO is placed in orbit. In response to a drag on the lock object RO, the display position of the lock object RO changes in accordance with the position of the user's finger, or equivalently, the current touch position.

With reference to part (b) of FIG. 4, while the lock object RO overlaps the release object DO due to a drag performed on the lock object RO, the lock object RO is dropped. Consequently, the locked state is released. When the locked state is released, a standby screen is displayed in place of the lock screen as illustrated in part (c) of FIG. 4. That is, the user can release the locked state by dragging the lock object RO and dropping it on the release object DO.

As illustrated in part (a) of FIG. 4, the lock object RO and the release object DO are displayed on the lower side of the display 14. This allows the user to easily release the locked state with the lock object RO through a one-hand operation. This also allows the user to release the locked state through a right-hand operation or a left-hand operation.

The lock object RO can be dropped on the release object DO while the lock object RO overlaps part of the release object DO or the lock object RO overlaps the entirety of the release object DO. The locked state is released when the lock object RO is dropped in either state.

The lock screen may display a shortcut object corresponding to, for example, the mail function. For example, such shortcut object is placed so as to be displayed on the circumference C. When the lock object RO is dragged and dropped on the shortcut object, the locked state is released and the function corresponding to the shortcut object is executed. That is, the user can concurrently release the locked state and execute the relevant function.

In embodiments of the present disclosure, an invalid area is set without a user being aware of it. In the invalid area, touch operations performed in error (erroneous touch operations) are made invalid on the basis of the touch operation detected while the lock screen is displayed.

Figure 5:
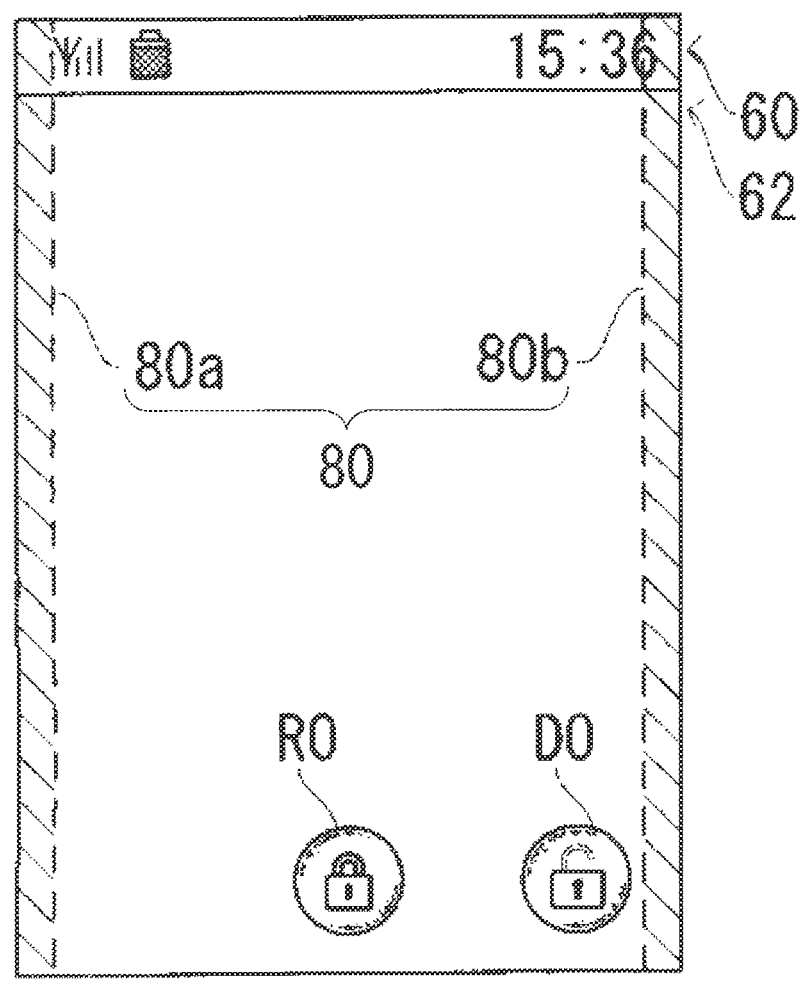
FIG. 5 illustrates an example of a predetermined area set on the lock screen illustrated in FIG. 3.

As illustrated in FIG. 5, a predetermined area 80 having a width of about 2 mm is set on the edge of the touch unit 16 (lock screen). In one embodiment, a predetermined area 80a is set on the left edge of the touch unit 16 and a predetermined area 80b is set on the right edge of the touch unit 16. That is, the predetermined area 80 is set in the position in which erroneous touch operations performed by the user are likely to be detected. In a case where the predetermined areas 80a and 80b are collectively referred to as the predetermined area 80, their reference signs are hereinafter omitted from the drawings.

Figure 6:
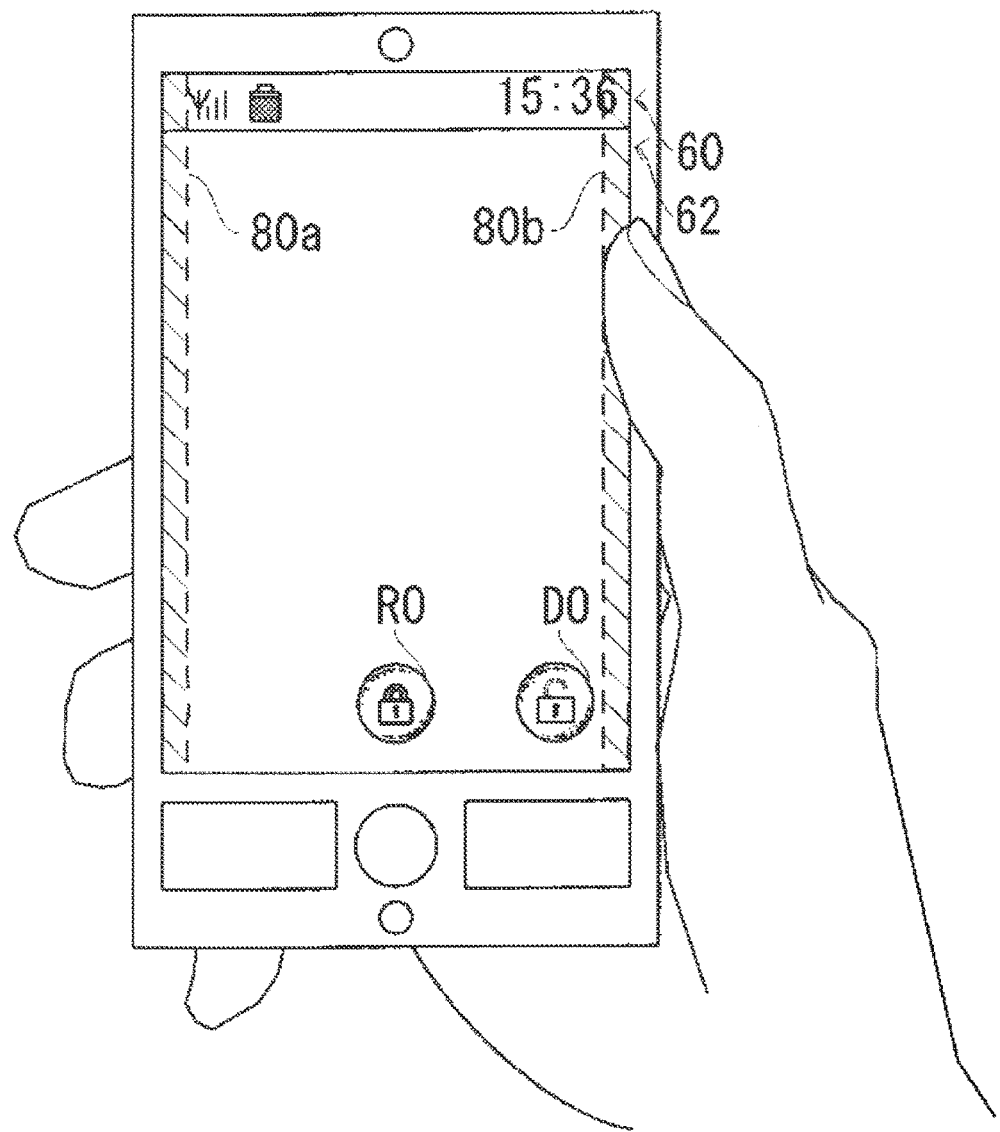
FIG. 6 illustrates an example of the state in which a touch operation is performed on the predetermined area illustrated in FIG. 5.
Figure 7:
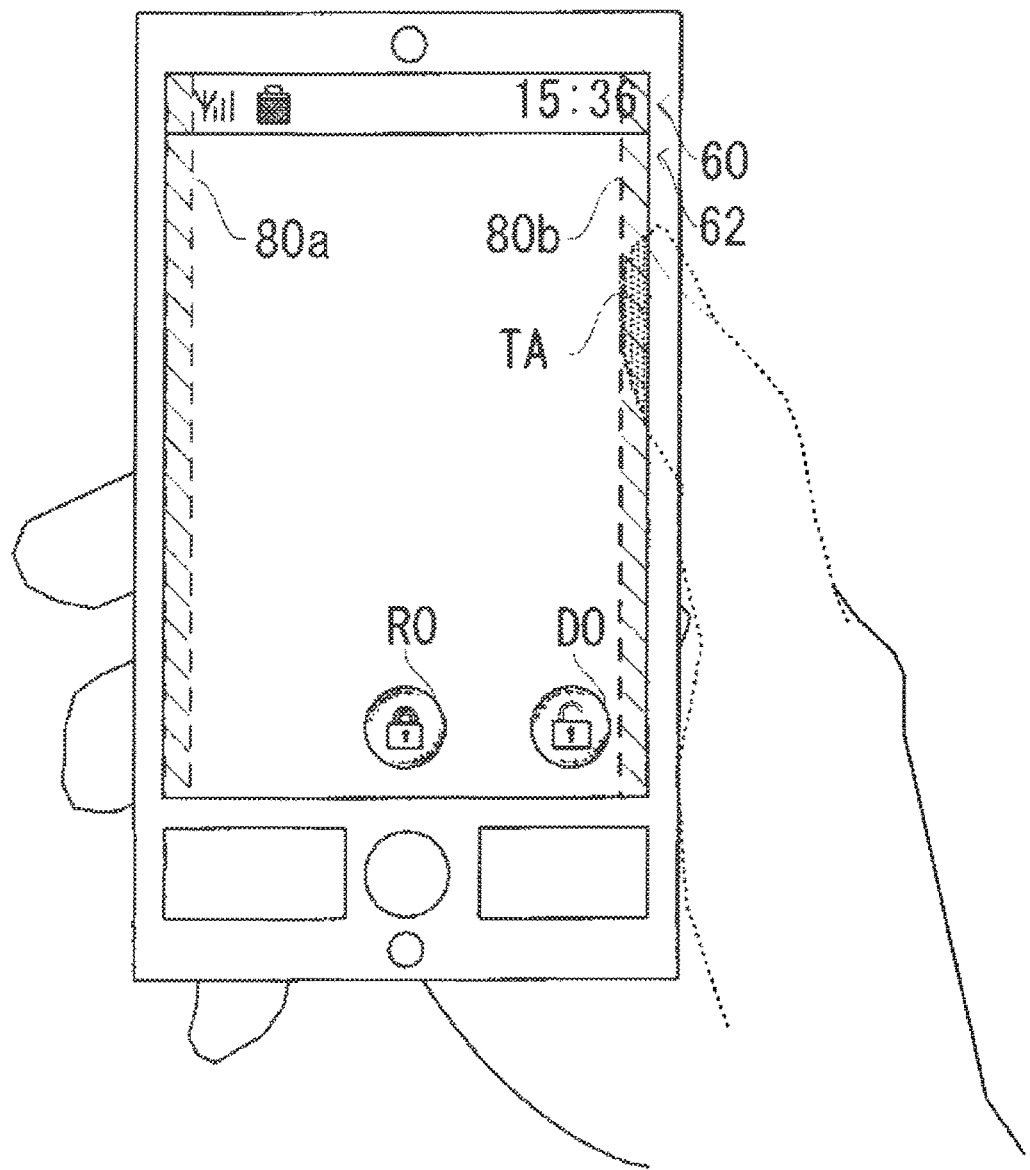
FIG. 7 illustrates an example of a touch area detected through the touch operation illustrated in FIG. 6.

As illustrated in FIG. 6, while the mobile phone 10 is held by a hand with the predetermined area 80 being set on the lock screen, the predetermined area 80b is erroneously touched by a finger in some cases. If this is the case, as illustrated in FIG. 7, the area of the predetermined area 80b (the touch unit 16) touched by the finger is detected as a touch area TA associated with the touch operation.

As illustrated in part (a) and part (b) of FIG. 8, with attention being given to the predetermined area 80b and the touch area TA, a tentative invalid area IA including the touch area TA in the predetermined area 80b is set upon detection of a touch operation in the predetermined area 80b while the lock screen is displayed. The tentative invalid area IA has a rectangular shape. The information indicating the tentative invalid area IA is stored in a history table as historical data.

FIG. 9 illustrates a schematic view showing an example of the historical data stored in the history table. The information indicating the tentative invalid area IA associated with the touch operation detected with the lock screen being displayed is stored in the history table as the historical data. As the historical data, coordinates ($X_1$, $Y_1$) indicating the upper left of the tentative invalid area IA and a length ($L_1$) in the vertical direction being the information indicating the size of the tentative invalid area IA are correlated and stored. Five pieces of historical data are stored in the history table. When the sixth piece of historical data is added, the older piece of historical data is deleted. In one embodiment, an invalid area NA is determined so as to completely cover the historical data (the tentative invalid area IA) stored in the history table. In one embodiment, the maximum number of pieces of historical data to be stored is five. In some embodiments, the maximum number may be smaller than five or greater than five.

Figure 10:
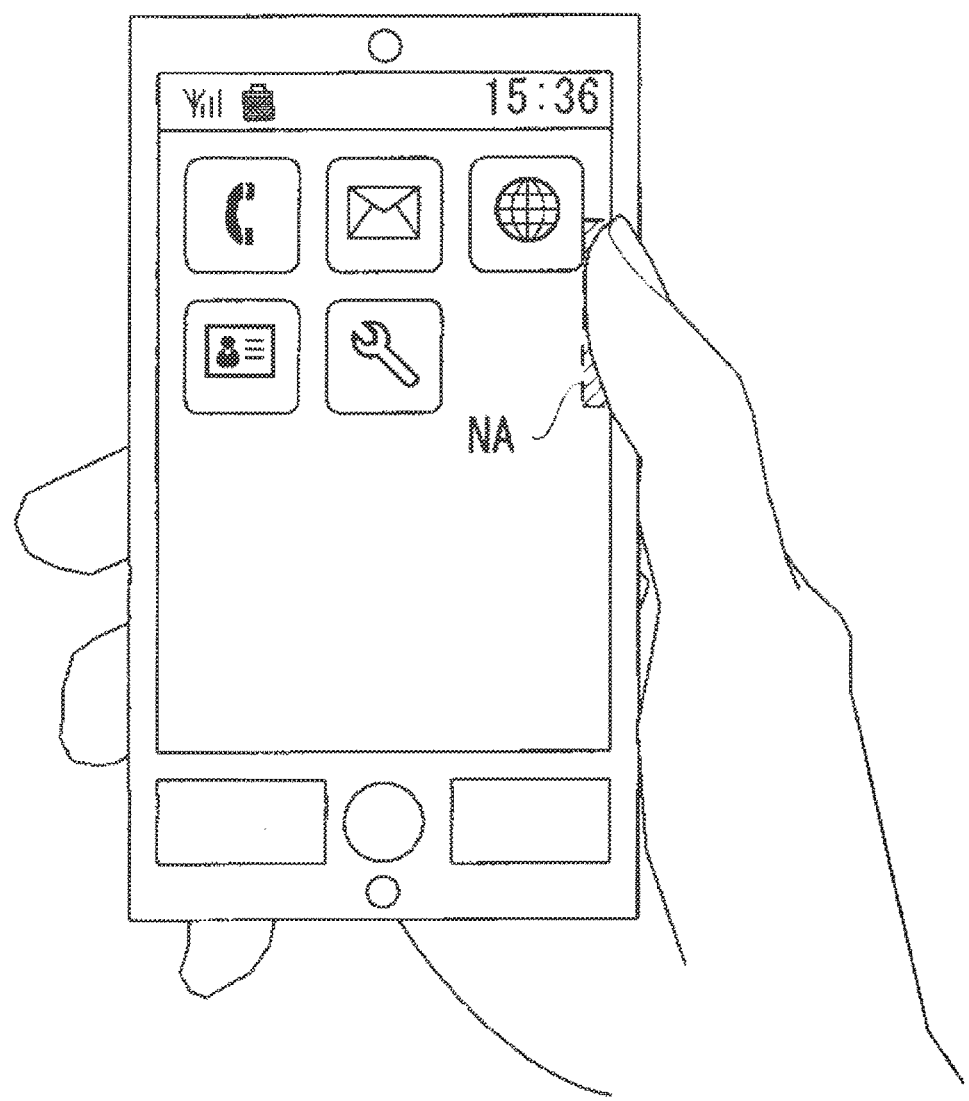
FIG. 10 illustrates an example of an invalid area set on the basis of the tentative invalid area illustrated in FIG. 8.

As illustrated in FIG. 10, when the locked state is released, the determined invalid area NA is set, providing the state in which the user's finger touches the invalid area NA. In some cases, the user holding the mobile phone 10 places his or her finger in substantially the same position. The invalid area NA is determined on the basis of the past five pieces of historical data as mentioned above, and thus, the invalid area NA can be set in the position in which erroneous touch operations are likely to be performed. This reduces malfunctions associated with erroneous touch operations performed after the locked state is released.

The invalid area NA is set on the basis of erroneous touches performed on the locked screen. Thus, the invalid area NA can be set without the need for the user to perform the operation to set the invalid area NA.

In one embodiment, a touch operation is made invalid through the processing in which the detection of the touch on the invalid area NA does not involve the execution of the subsequent processing. In another embodiment, the touch operation may be made invalid by preventing electric power supply to the electrode of the touch unit 16 corresponding to the invalid area NA. The touch operations that are made invalid include a flick operation and a drag operation started from positions within the invalid area NA. In a case where part of a touch operation is performed within the invalid area NA, the touch operation is made invalid.

In response to a touch operation performed on the invalid area NA as illustrated in part (a) of FIG. 11, a notification pop-up P1 is displayed on the display 14 as illustrated in part (b) of FIG. 11. In one embodiment, the invalid area NA is set without a user being aware of it. If the user receives no response upon a touch operation, the user would suspect that the mobile phone 10 is broken. In one embodiment, the notification pop-up P1 is displayed in response to a touch operation on the invalid area NA, to thereby notify the user that the touch operation is made invalid. Consequently, the user becomes aware of the touch operation performed on the invalid area NA. The notification pop-up P1 is automatically deleted after a lapse of a predetermined length of time (for example, one second). In a state where the touch is continued since before the setting of the invalid area NA, for example, in a case where the locked state is released with the lock screen being touched, the notification pop-up P1 is not displayed.

In another embodiment, a notification may be provided through voice, vibration, and light in place of the notification pop-up P1. The invalid area NA may be colored to allow the visual recognition of the invalid area NA. Assuming that the invalid area NA is colored, the invalid area NA may be temporarily colored in response to a touch operation or the colored state may be maintained.

Next, in a case where the number of touch operations performed on the invalid area NA exceeds a predetermined number of times (for example, five times), a checking pop-up P2 that checks whether to cancel the invalid area NA is displayed in place of the notification pop-up P1 as illustrated in part (c) of FIG. 11. The checking pop-up P2 includes the approval key Y for approving the cancellation of the invalid area NA and a denial key N for denying the cancellation of the invalid area NA. The invalid area NA is cancelled in response to a touch operation performed on the approval key Y. The invalid area NA is not cancelled if a touch operation is performed on the denial key N. The checking pop-up P2 is deleted in response to a touch operation on one of the keys. The denial key N is automatically selected after a lapse of a predetermined length of time (for example, 5 seconds) since the appearance of the checking pop-up P2, and then, the displaying of the checking pop-up P2 is deleted.

Thus, a user can optionally cancel the invalid area NA in a case where the invalid area NA obstructs touch operations.

Subsequently, an example of touch operations on the predetermined area 80 is described with reference to FIGS. 12 to 14. Firstly, as illustrated in part (a) and part (b) of FIG. 12, in response to a touch operation bridging over the predetermined area 80 and another area, or equivalently, in a case where the touch area TA includes the boundary line of the predetermined area 80, the tentative invalid area IA is set within the predetermined area 80 as illustrated part (c) of FIG. 12. Meanwhile, the tentative invalid area IA is not set outside the predetermined area 80. Thus, the range in which the invalid area NA is set can be optionally restricted.

Next, as illustrated in part (a) and part (b) of FIG. 13, assume that touch operations are performed on the individual predetermined areas 80$a$ and 80$b$. In this case, as illustrated in part (c) of FIG. 13, a tentative invalid area IA1 and a tentative invalid area IA2 are set in the plurality of predetermined areas 80$a$ and 80$b$, respectively.

As illustrated in part (b) of FIG. 13, assume that two touch areas being a touch area TA2 and a touch area TA3 are included in the predetermined area 80$a$ alone. In this case, as illustrated in part (c) of FIG. 13, the tentative invalid area IA2 is set so as to include these touch areas. In another embodiment, as illustrated in part (a), part (b), and part (c) of FIG. 14, a tentative invalid area IA3 and a tentative invalid area IA4 may be set correspondently to two touch areas being a touch area TA4 and a touch area TA5.

In another area, an invalid area NA may be set on the basis of the mean value of the center of gravity of the invalid area IA. For example, the normal size of the invalid area NA is set on the basis of the size (a length L) of the first tentative invalid area IA, and then, the invalid area NA having the normal size is determined on the basis of the calculated mean value of the center of gravity. In still another embodiment, the size of the invalid area NA may be equivalent to the mean value of the plurality of tentative invalid areas IA.

The information indicating the predetermined area 80, the tentative invalid area IA, and the invalid area NA includes the coordinates of the upper left and the lengths in the vertical direction. In another embodiment, the coordinates of the upper left and the coordinates of the lower right may be included. In a case where the predetermined area 80 is set in one place and the tentative invalid area IA has a rectangular shape, a coordinate (X) in the horizontal direction included in the coordinates indicating the upper left (lower right) of the tentative invalid area IA is located on the boundary line of the predetermined area 80. The coordinate of the horizontal area may be thus omitted from the coordinates stored in the history table.

The tentative invalid area IA and the invalid area NA may have shapes other than the rectangular shapes. In another embodiment, the tentative invalid area IA and the invalid area NA may reflect the shapes of the touch area TA as it is.

The characteristics of some embodiments have been described above. They will be described below in detail with reference to a memory map illustrated in FIG. 15, and flowcharts illustrated in FIGS. 16 and 17.

Figure 15:
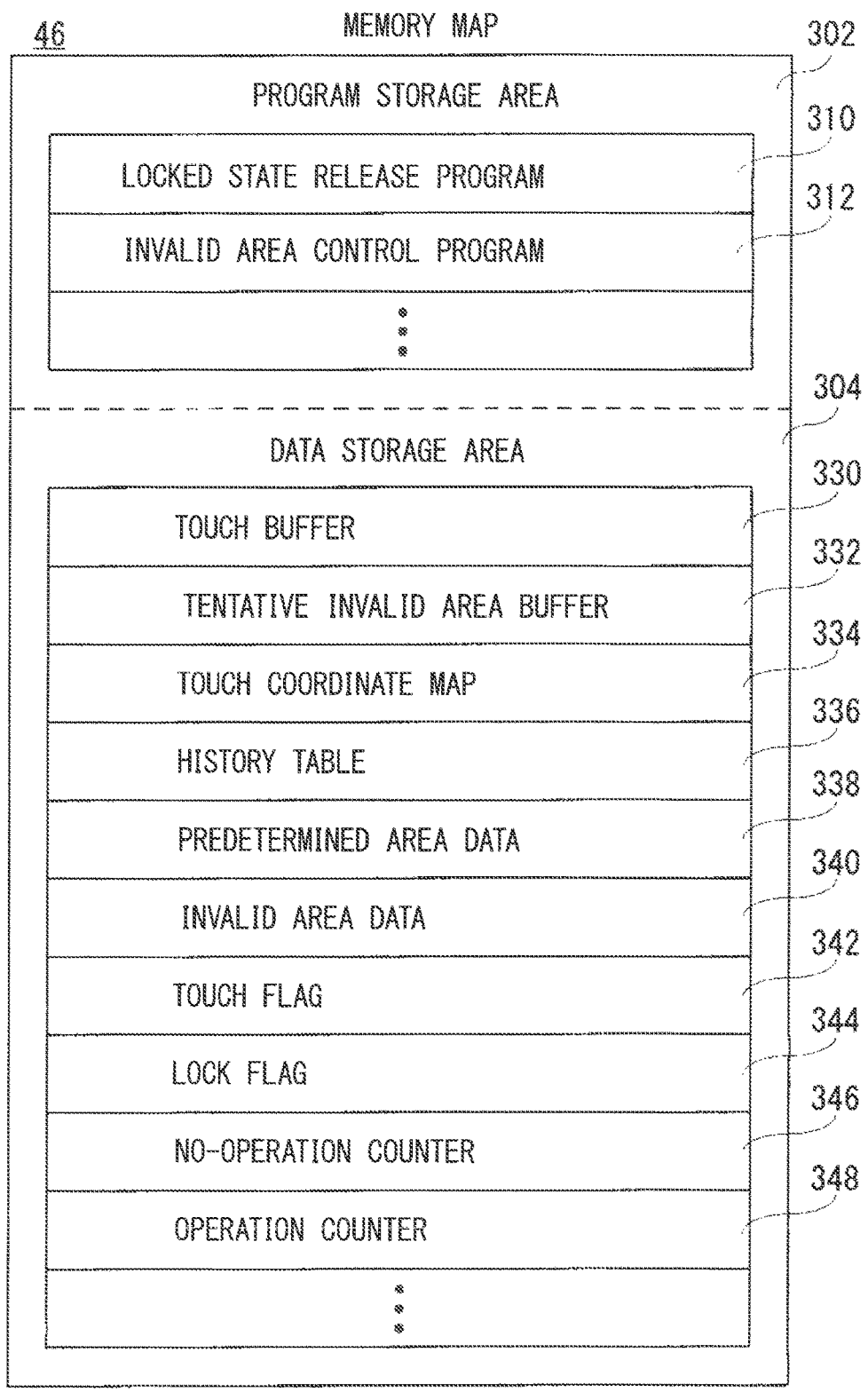
FIG. 15 illustrates an example of a memory map of the RAM illustrated in FIG. 2.

As illustrated in FIG. 15, the RAM 46 illustrated in FIG. 2 includes a program storage area 302 and a data storage area 304 formed therein. As in the above description, the program storage area 302 is the area in which part or all of the program data preset in the flash memory 44 (FIG. 2) is read out and stored (expanded).

Programs are stored in the program storage area 302, including a locked state release program 310 for releasing the locked state and an invalid area control program 312 for cancelling the invalid area NA. The program storage area 302 includes programs for executing, for example, the telephone function and the mail function.

The data storage area 304 of the RAM 46 includes, for example, a touch buffer 330 and a tentative invalid area buffer 332 and can store, for example, a touch coordinate map 334, a history table 336, a predetermined area data 338, and an invalid area data 340. The data storage area 304 includes a touch flag 342, a lock flag 344, a no-operation counter 346, and an operation counter 348.

The touch buffer 330 can temporarily store the data on the touch coordinates output by the touch unit control circuit 48. The invalid area buffer 332 can temporarily store the information indicating the invalid area IA set on the basis of the touch area TA.

The touch coordinate map 334 is the data for bringing the touch coordinates associated with a touch operation into correspondence with the display coordinates on the display 14. That is, on the basis of the touch coordinate map 334, the results of the touch operation performed on the touch unit 16 are reflected on the displaying on the display 14. The history table 336 is the table in which a plurality of pieces of historical data are stored as illustrated in, for example, FIG. 9. The predetermined area data 338 is the data indicating the predetermined area 80 set on the lock screen. The invalid area data 340 includes the information indicating the invalid area NA determined on the basis of the historical data stored in the history table 336.

The touch flag 342 is the flag for judging whether the touch unit 16 is touched. For example, the touch flag 342 includes a 1-bit register. When the touch flag 342 is turned on (established), the data value "1" is set for the register. When the touch flag 342 is turned off (not established), the data value "0" is set for the register. The touch flag 344 is switched between on and off on the basis of the signal output by the touch unit control circuit 48.

The lock flag 344 is the flag for indicating whether the locked state is set. For example, the lock flag 344 is turned on in accordance with the processing of turning off the power of the display 14 and the power of the touch unit 16. The lock flag 344 is turned off in accordance with the processing of the locked state release program 310 mentioned above. The lock flag 344 has substantially the same configuration as that of the touch flag 342, and the detailed description on the relevant configuration is omitted.

The no-operation counter 346 is the counter for measuring the time (no-operation time) in which no operation is performed. The no-operation counter 346 starts counting upon initialization and reaches completion after a lapse of a predetermined length of time (for example, 30 seconds). The no-operation counter 346 is therefore also referred to as a no-operation timer. The operation counter 348 is the counter for counting the number of touches performed on the invalid area NA. For example, the value obtained by the operation counter 348 is incremented every time a touch operation is performed on the invalid area NA.

The data storage area 304 can store, for example, the image data to be displayed in the standby state and the data on character strings. The data storage area 304 includes counters and flags necessary for the operation of the mobile phone 10.

Figure 16:
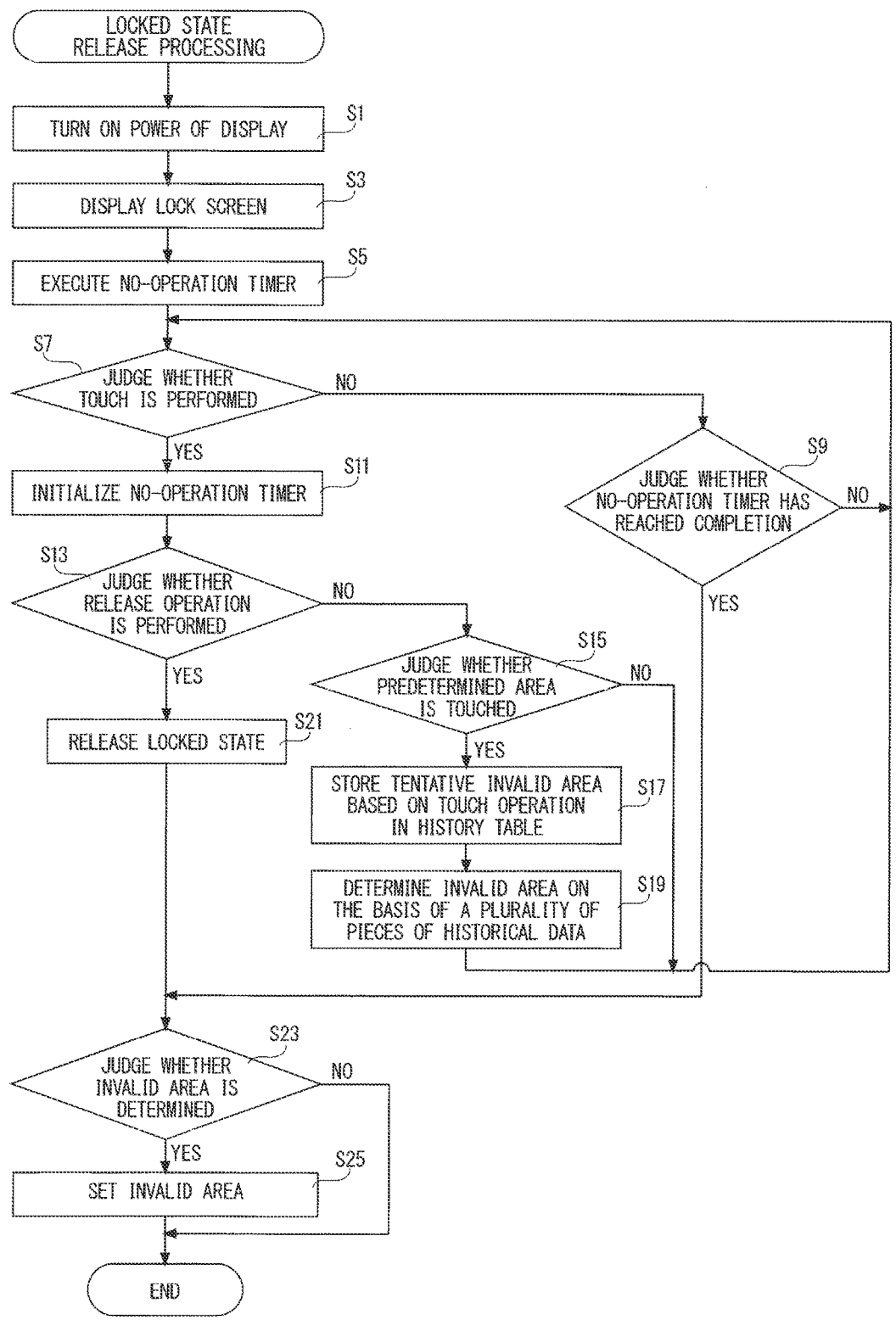
FIG. 16 illustrates a flowchart showing an example of a locked state release processing performed by a processor illustrated in FIG. 2.
Figure 17:
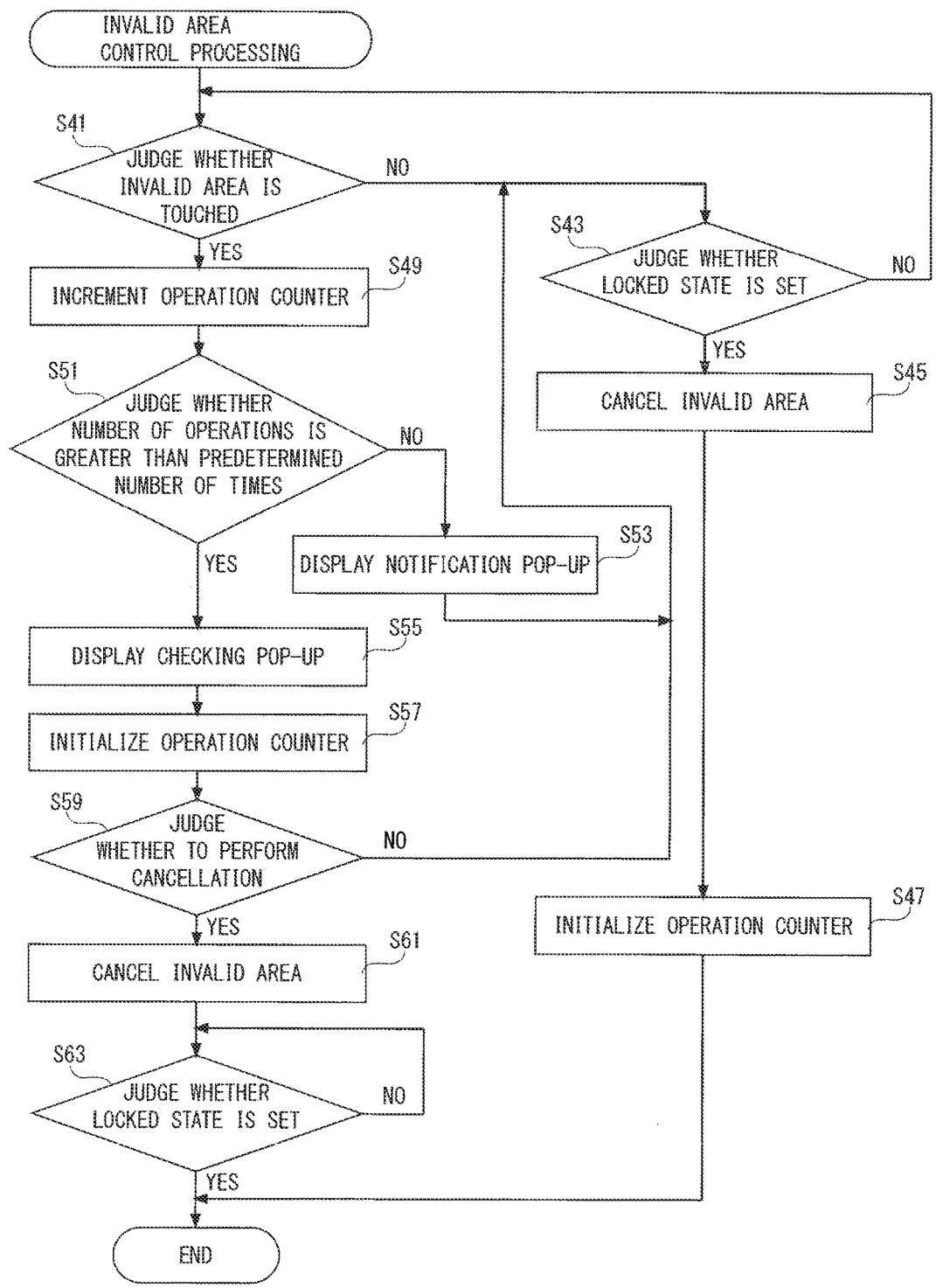
FIG. 17 illustrates a flowchart showing an example of an invalid area control processing performed by the processor illustrated in FIG. 2.

The processor 30 processes, in parallel, a plurality of tasks including the locked state release processing illustrated in FIG. 16 and the invalid area control processing illustrated in FIG. 17 under the control of the operating system (OS) based on the Linux (registered trademark) such as the Android (registered trademark) and the REX or another OS.

The locked state release processing illustrated in FIG. 16 is executed in response to an operation performed on, for example, the end key 22b with the locked state being set (with the lock flag 344 being turned on).

In Step S1, the processor 30 turns on the power of the display 14. Subsequently, in Step S3, the processor 30 causes the lock screen to appear. For example, the data necessary for the displaying of the lock screen is read out, and then, the lock screen illustrated in FIG. 3 is displayed in the function display area 62 of the display 14.

Subsequently, in Step S5, the processor 30 executes the no-operation timer. Thus, the no-operation counter 346 is initialized.

Subsequently, in Step S7, the processor 30 judges whether a touch is performed. That is, a judgement is made on whether a touch operation is performed on the touch unit 16 and the touch flag 342 is thus turned on. For "NO" in Step S7, or equivalently, with no touch operation being performed, the processor 30 judges, in Step S9, whether the no-operation timer has reached completion. That is, a judgement is made on whether a predetermined length of time has passed with no operation being performed on the mobile phone 10. For "YES" in Step S9, or equivalently, with a lapse of a predetermined length of time in the state of no operation, the processor 30 proceeds to Step S23. For "NO" in Step S9, or equivalently, without a lapse of a predetermined length of time in the state of no operation, the processor 30 returns to Step S7.

For "YES" in Step S7, or equivalently, in response to a touch operation, the processor 30 initializes the no-operation timer in Step S11. That is, a touch operation is performed before a lapse of the predetermined length of time in the state of no operation, so that the no-operation counter 346 is initialized again.

Subsequently, in Step S13, the processor 30 judges whether a release operation is performed. For example, a judgment is made on whether the release operation illustrated in FIG. 4 is performed. For "NO" in Step S13, or equivalently, with no release operation being performed, the processor 30 judges, in Step S15, whether the predetermined area 80 is touched. That is, the processor 30 judges whether the coordinates of the touch area TA stored in the touch buffer 330 are included in the predetermined area 80 indicated by the predetermined area data 338. For "NO" in Step S15, or equivalently, with no touch operation being performed on the predetermined area 80, the processor 30 returns to Step S7. The processor 30 executing the processing in Step S15 functions as a detection module.

Meanwhile, for "YES" in Step S15, or equivalently, with a touch operation being performed on the predetermined area 80b as illustrated in, for example, FIG. 6, the tentative invalid area IA based on the touch operation is stored in the history table 336 in Step S17. In a case where the predetermined area 80b is touched as illustrated in, for example, FIG. 6, the tentative invalid area IA illustrated in part (b) of FIG. 8 is set on the basis of the touch area TA illustrated in FIG. 7, and then, the information indicating the tentative invalid area IA is stored in the tentative invalid area buffer 332. Then, the information stored in the tentative invalid area buffer 332 is stored in the history table 336 as the historical data. Subsequently, in Step S19, the processor 30 determines the invalid area NA on the basis of a plurality of pieces of historical data. In a case where the historical data corresponding to a plurality of tentative invalid areas IA is stored in the history table 336, the invalid area NA is determined so as to include the plurality of tentative invalid areas IA, and then, the information indicating the invalid area NA is stored as the invalid area data 340. When the processing in Step S19 is ended, the processor 30 returns to Step S7. The processor 30 executing the processing in Step S17 functions as a storage unit and the processor 30 executing the processing in Step S19 functions as a determination unit.

For "YES" in Step S13, or equivalently, in response to a release operation, the processor 30 releases the locked state in Step S21. Subsequently, in Step S23, the processor 30 judges whether the invalid area NA is determined. That is, a judgment is made on whether the invalid area data 340 includes the information indicating the invalid area NA. For "NO" in Step S23, for example, in a case where no touch operation is performed on the predetermined area 80 and the invalid area NA is not determined, the processor 30 ends the locked state release processing.

Meanwhile, for "YES" in Step S23, or equivalently, with a touch operation being performed on the predetermined area 80 as illustrated in, for example, FIG. 6, the processor 30 sets the invalid area NA in Step S25. For example, the invalid area NA illustrated in, for example, FIG. 10 is set on the basis of the invalid area data 340. When the processing in Step S25 is ended, the processor 30 ends the locked state release processing. The processor 30 executing the processing in Step S25 functions as a setting module.

FIG. 17 illustrates a flowchart showing the invalid area control processing. When the locked state is released, the processor 30 executes the invalid area control processing. In Step S41, the processor 30 judges whether the invalid area NA is touched. The processor 30 judges whether the touch position stored in the touch buffer 330 is within the invalid area NA indicated by the invalid area data 340. The predetermined processing is not executed in response to a touch operation detected in Step S41.

For "NO" in Step S41, or equivalently, with no touch operation being performed on the invalid area NA the processor 30 judges, in Step S43, whether the locked state is set. For example, the processor 30 judges whether the end key 22b is pushed down and accordingly the lock flag 344 is turned on. For "YES" in Step S43, or equivalently, upon setting of the locked state, the processor 30 cancels the invalid area NA in Step S45, initializes the operation counter 348 in Step S47, and ends the invalid area control processing. That is, the information on the invalid area NA included in the invalid area data 340 is deleted and the number of times counted by the operation counter 348 is initialized. Meanwhile, for "NO" in Step S43, for example, in a case where the operation to set the locked state is not performed, the processor 30 returns to Step S41.

For "YES" in Step S41, or equivalently, with a touch operation being performed on the invalid area NA, the processor 30 increments the operation counter 348 in Step S49. That is, the number of operations performed on the invalid area NA is counted. Subsequently, in Step S51, the processor 30 judges whether the number of operations is greater than a predetermined number of times. That is, a judgment is made on whether the number of operations counted by the operation counter 348 is greater than the predetermined number (for example, 5 times). For "NO" in Step S51, or equivalently, in a case where the number of operations is smaller than the predetermined number of times, the processor 30 causes the notification pop-up P1 to appear in Step S53. For example, as illustrated in part (b) of FIG. 11, the notification pop-up P1 is displayed on the display 14. After a lapse of a predetermined length of time since the appearance of the notification pop-up P1, the processor 30 deletes the displaying of the notification pop-up P1, and then, returns to the processing in Step S41. The processor 30 executing the processing in Step S49 functions as a counting module and the processor 30 executing the processing in Step S53 functions as a notification module.

Meanwhile, for "YES" in Step S51, or equivalently, in a case where the number of operations is greater than the predetermined number of times, the processor 30 causes the checking pop-up P2 to appear in Step S55. For example, as illustrated in part (c) of FIG. 11, the checking pop-up P2 that checks whether to cancel the invalid area NA is displayed on the display 14. Subsequently, in Step S57, the processor 30 initializes the operation counter 348. That is, the number of operations exceeds the predetermined number of times, and thus, the number of operations counted by the operation counter 348 is initialized.

Subsequently, in Step S59, the processor 30 judges whether to perform the cancellation. For example, the processor 30 judges whether the approval key Y that accepts the cancellation of the invalid area NA is operated. For "NO" in Step S59, for example, in a case where the denial key N is operated, the processor 30 returns to Step S41. Meanwhile, for "YES" in Step S59, or equivalently, in a case where the approval key Y is operated, the processor 30 cancels, in Step S61, the invalid area NA as in Step S45. The processor 30 executing the processing in Step S59 functions as a judgment module and the processor 30 executing the processing in Step S61 functions as a cancellation module.

Subsequently, as in Step S43, the processor 30 judges, in Step S63, whether the locked state is set. For "NO" in Step S63, for example, in a case where the operation to set the locked state is not performed, the processor 30 repeats the processing in Step S63. Meanwhile, for "YES" in Step S63, or equivalently, in a case where the operation to set the locked state is performed, the processor 30 ends the invalid area control processing.

For the locked state release processing in the absence of the detection of a touch operation in the predetermined area 80, the invalid area NA may be set, as long as the historical data is stored, after the locked state is released. The invalid area control processing may be performed in such a manner that the setting of the locked state does not involve the cancellation of the invalid area NA.

The invalid area NA may be designed to be set again after a lapse of a predetermined length of time since being cancelled.

For the invalid area control processing in another embodiment, the count of the number of operations may be initialized at fixed time intervals or may be initialized every time the display content on the display 14 is switched. For example, the number of touches performed on the invalid area NA and the touch position conceivably vary depending on the display content on the display 14. In another embodiment mentioned above, the invalid area NA may be cancelled and set more properly in accordance with an operation performed by a user.

The setting of the invalid area NA may be made valid or invalid while a predetermined application is executed or a predetermined screen is displayed. For example, the setting of the invalid area NA is made valid during the displaying of a frequently-operated screen, such as a Web screen or a screen related to a mail application. Meanwhile, the setting of the invalid area NA is made invalid during the displaying of a seldom-operated screen related to, for example, a TV application or an electronic book browser. The setting of the invalid area NA may be made invalid during the displaying of, for example, the home screen and a screen related to a game application with objects to be operated being displayed on the entire screen.

In the above-mentioned embodiments, the expression "greater than" has been used to describe the threshold values of, for example, the predetermined number of times. The expression "greater than the threshold value" also means "equal to or greater than the threshold value." The expression "not greater than the threshold value" can be translated into "smaller than the threshold value." These expressions also mean "equal to or smaller than the threshold value" and "less than the threshold value."

The programs implemented in one embodiment may be stored in the HDD of the server for data delivery and may be delivered to the mobile phone 10 through a network. The storage media including optical disks such as CDs, DVDs, Blue-Ray Disks (BDs), USB memories, and memory cards may be sold or distributed with a plurality of programs being stored in the storage media. The effects equal to those of one embodiment may be produced if the programs downloaded through the server or the storage media mentioned above are installed on the mobile terminal having the configuration equal to that of one embodiment.

The specific numerical values mentioned herein are provided as merely an example, and therefore, may be appropriately changed in accordance with, for example, changes in product specifications.

The invention claimed is:

1. A mobile terminal including a display unit and a touch unit located on a surface of the display unit, the display unit being configured to display a lock screen capable of setting a locked state in which execution of a predetermined processing based on a touch operation is restricted and capable of releasing the locked state through a touch operation performed on the touch unit while the locked state is set,
   the mobile terminal comprising at least one processor configured to:
   detect a touch operation performed on a predetermined area of the lock screen; and
   set, in a case where the detection module detects a touch operation performed on the predetermined area when the mobile terminal is in the locked stated, an invalid area on the basis of the touch operation, wherein even after the mobile terminal is released from the locked state a touch operation detected in the invalid area is determined to be invalid.

2. The mobile terminal according to claim 1, further comprising a storage unit configured to store, as historical data, information indicating a touch area associated with a touch operation performed on the predetermined area,
   wherein the at least one processor determines the invalid area on the basis of the historical data.

3. The mobile terminal according to claim 1, wherein the at least one processor is further configured to provide a notification that a touch operation on the invalid area set by the setting module is invalid.

4. The mobile terminal according to claim 1, wherein the at least one processor is further configured to:
   count the number of touch operations performed on the invalid area set by the at least one processor;
   judge whether a number of touch operations performed on the invalid area counted by the at least one processor is greater than predetermined number of times; and
   cancel the invalid area when the number of touch operations performed on the invalid area is judged to be greater than the predetermined number of times.

5. The mobile terminal according to claim 1, wherein when a touch area associated with a touch operation crosses a boundary line of the predetermined area, the at least one processor determines the invalid area based on a portion of the touch area within the predetermined area.

6. The mobile terminal according to claim 1, wherein the predetermined area is set on an edge of the touch unit.

7. A non-transitory computer readable storage medium that stores an invalid area setting program used in a mobile terminal including a display unit and a touch unit located on a surface of the display unit, the display unit being configured to display a lock screen capable of setting a locked state in which execution of a predetermined processing based on a touch operation is restricted and capable of releasing the locked state through a touch operation performed on the touch unit while the locked state is set,
   wherein the program causes a processor of the mobile terminal to:
   detect a touch operation performed on a predetermined area of the lock screen; and
   set, in a case where the processor detects a touch operation performed on the predetermined area when the mobile terminal is in the locked stated, an invalid area on the basis of the touch operation, wherein even after the mobile terminal is released from the locked state a touch operation detected in the invalid area is determined to be invalid.

8. A method for setting an invalid area for a mobile terminal including a display unit and a touch unit located on a surface of the display unit, the display unit being configured to display a lock screen capable of setting a locked state in which execution of a predetermined processing based on a touch operation is restricted and capable of releasing the locked stated through a touch operation performed on the touch unit while the locked state is set,
   the method causing a processor of the mobile terminal to execute:
   detecting a touch operation performed on a predetermined area of the lock screen; and
   setting, in a case where a touch operation on the predetermined area is detected when the mobile terminal is in the locked stated, an invalid area on the basis of the touch operation, wherein even after the mobile terminal is released from the locked state a touch operation detected in the invalid area is determined to be invalid.

\* \* \* \* \*